United States Patent
Janczak et al.

(10) Patent No.: US 9,779,696 B2
(45) Date of Patent: Oct. 3, 2017

(54) SERIALIZED ACCESS TO GRAPHICS RESOURCES

(71) Applicant: Intel Corporation, Santa Clara, CA (US)

(72) Inventors: Tomasz Janczak, Gdansk (PL); Aaron Lefohn, Bothell, WA (US); Marco Salvi, San Francisco, CA (US); Larry Seiler, Boylston, MA (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 14/102,855

(22) Filed: Dec. 11, 2013

(65) Prior Publication Data

US 2014/0198113 A1 Jul. 17, 2014

Related U.S. Application Data

(60) Provisional application No. 61/753,254, filed on Jan. 16, 2013.

(51) Int. Cl.
*G09G 5/36* (2006.01)
*G09G 5/393* (2006.01)
*G09G 5/00* (2006.01)
*G06T 1/20* (2006.01)
*G06T 15/00* (2011.01)

(52) U.S. Cl.
CPC ............ *G09G 5/363* (2013.01); *G06T 1/20* (2013.01); *G06T 15/005* (2013.01); *G09G 5/001* (2013.01); *G09G 5/393* (2013.01); *G09G 2352/00* (2013.01)

(58) Field of Classification Search
None
See application file for complete search history.

(56) References Cited

U.S. PATENT DOCUMENTS

| 7,456,833 | B1 | 11/2008 | Diard |
| 2008/0313434 | A1* | 12/2008 | Naoi ............................ 712/216 |
| 2010/0250809 | A1 | 9/2010 | Ramesh et al. |
| 2011/0249011 | A1 | 10/2011 | Lalonde et al. |
| 2012/0206447 | A1* | 8/2012 | Hutchins ............... G06T 15/005 345/419 |

(Continued)

FOREIGN PATENT DOCUMENTS

| CN | 101563712 A | 10/2009 |
| CN | 102736947 A | 10/2012 |

OTHER PUBLICATIONS

Extended European search Report received for European Patent Application No. 14151113.9, mailed on Apr. 16, 2014, 7 Pages.

*Primary Examiner* — Ke Xiao
*Assistant Examiner* — Donna J Ricks
(74) *Attorney, Agent, or Firm* — Jordan IP Law, LLC

(57) ABSTRACT

Methods and systems may provide for identifying a plurality of subject commands that reference a common screen location and access a read/write resource, and serializing the plurality of subject commands according to a predefined order. Additionally, execution of the plurality of subject commands may be deferred until one or more additional commands referencing the common screen location are executed. In one example, the plurality of subject commands are serialized in response to a serialization command.

12 Claims, 5 Drawing Sheets

(56) References Cited

U.S. PATENT DOCUMENTS

2012/0313953 A1* 12/2012 Owen .................. G06F 17/246
                                                    345/581
2013/0002678 A1*  1/2013 Cornell ........................ 345/467
2014/0098117 A1*  4/2014 Goel et al. ................... 345/522
2014/0306970 A1  10/2014 Surti et al.

* cited by examiner

SERIALIZED ACCESS TO GRAPHICS RESOURCES

CROSS-REFERENCE TO RELATED APPLICATIONS

The present application claims the benefit of priority to U.S. Provisional Patent Application No. 61/753,254 filed on Jan. 16, 2013.

BACKGROUND

Graphics pipelines may be used to generate pixels for display on a screen. For example, a graphics pipeline may accept a representation of an image as an input and generate pixel representations of the image. In one example, the graphics pipeline is represented as a series of stages, wherein one such stage is a program or circuitry called a pixel shader. A pixel shader may receive interpolated vertex data (e.g., "primitives" such as triangles) and output pixel colors based on the interpolated vertex data.

Multiple pixel shaders may operate concurrently in order to achieve data parallelism in graphics devices. For example, a single pixel shader invocation might calculate color (and potentially other attributes) of a single pixel on a screen, wherein all pixels on a screen can be computed in parallel. Moreover, multiple pixel shaders operating in parallel may refer to the same screen location (e.g., same x, y coordinates). While each pixel shader invocation may be independent of other pixel shader invocations, graphics devices may guarantee that writes to render target resources are processed in a particular order.

Certain application programming interfaces (APIs) such as, for example, DIRECTX (registered trademark of Microsoft Corporation) and OPENGL (registered trademark of Silicon Graphics, Inc.) may provide ordering for render target write operations, but may lack any such order guarantee for other read/write (R/W) resources such as unordered access views (DIRECTX) or images (OPENGL). Traditional ordering techniques may maintain a linked list of objects in external memory and use global atomic operations to guarantee serialized access to the list. Such an approach, however, may introduce significant costs in highly parallelized graphics architectures. For example, global memory atomics may involve the use of atomic counters or synchronization primitives that require atomic operations (e.g., mutual exclusions/mutexes), which may significantly impact performance. Additionally, atomic operations themselves may consume memory bandwidth and interfere with other input/output (I/O) requests.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
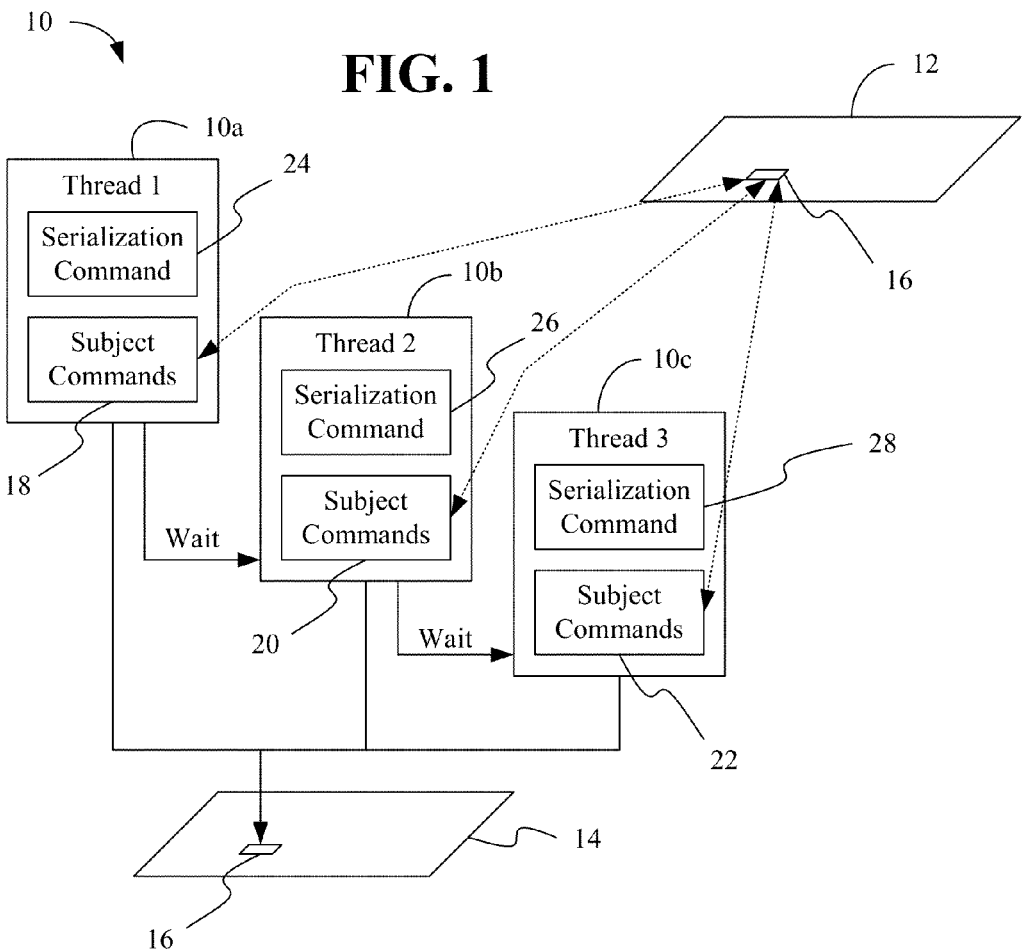
FIG. 1 is an illustration of an example of a plurality of threads accessing a read/write resource according to an embodiment.

FIG. 1 shows a plurality of threads 10 (10a-10c) that enable the presentation of visual content in a highly parallelized graphics computing environment. The illustrated threads 10 generally contain one or more compiled commands that access a read/write (R/W) resource 12 (e.g., DIRECTX unordered access view/UAV, OPENGL image, general purpose buffer, etc.) while performing functions such as, for example, pixel shading. In the case of pixel shading, each thread 10 may receive incoming primitives as part of a rasterization stage of a graphics pipeline and output pixel colors based on the incoming primitives. The results of those functions may be written to a render target 14 that is output via a display/screen (not shown, e.g., liquid crystal display/LCD, light emitting diode (LED) display, etc.). In the illustrated example, the threads 10 operate on a common screen location 16 (e.g., x, y coordinate). Accordingly, a serialization technique may be used to ensure proper access order between the threads 10 as well as between the pixel shading commands within the threads 10. Of particular note is that the serialization technique may use a single serialization command instead of global atomic operations (atomics). As a result, the illustrated solution may reduce memory space requirements and consume less memory bandwidth than conventional solutions.

For example, a first thread 10a may be configured to write transparency information (e.g., a window) computed by a first plurality of subject commands 18 (e.g., a first pixel shader invocation) to the R/W resource 12 at the common screen location 16, a second thread 10b may be configured to write transparency information (e.g., smog) computed by a second plurality of subject commands 20 (e.g., a second pixel shader invocation) to the R/W resource 12 at the common screen location 16, and a third thread 10c may be configured to write transparency information (e.g., smog) computed by a third plurality of subject commands 22 (e.g., a third pixel shader invocation) to the R/W resource 12 at the common screen location 16. As will be discussed in greater detail, each thread 10 may serialize its commands according to a predefined order and defer execution of its commands until one or more additional commands referencing the common screen location 16 are executed. The predefined order may be determined based on, for example, the rasterization order of incoming primitives (e.g., interpolated vertex data, triangles, etc.).

Thus, the first thread 10a might serialize the first plurality of subject commands 18 according to a predefined order in response to a first serialization command 24 and defer execution of the first plurality of subject commands 18 until the second plurality of subject commands 20 are executed. In such a case, the predefined order may be determined based on, for example, the rasterization order of incoming primitives associated with the first plurality of subject commands 18. Similarly, the second thread 10b may serialize the second plurality of subject commands 20 according to a predefined order in response to a second serialization command 26 and defer execution of the second plurality of subject commands 20 until the third plurality of subject commands 22 are executed. Again, the predefined order may be determined based on, for example, the rasterization order of incoming primitives associated with the second plurality of subject commands 20. In addition, the third thread 10c may serialize the third plurality of subject commands 22 according to a predefined order in response to a third serialization command 28 and defer execution of the third plurality of subject commands 22 until one or more additional commands referencing the common screen location 16 are executed.

The illustrated serialization commands 24, 26, 28, which are separate from the subject commands 18, 20, 22, respectively, may be read in a high level language such as, for example, the DIRECTX High Level Shading Language (HLSL), the OPENGL Shading Language (GLSL), and so forth. Such an approach may obviate any concerns over restrictions on shader code related to prevention of hangs, delays, etc. In addition, the illustrated solution may be particularly advantageous for applications such as order-independent transparency (OIT) applications, blending applications (e.g., blending operators, non-linear color spaces, unique encodings), depth peeling, constructive solid geometry, depth of field blur, motion blur, volume rendering, etc., in which shader ordering is relevant.

Figure 2:
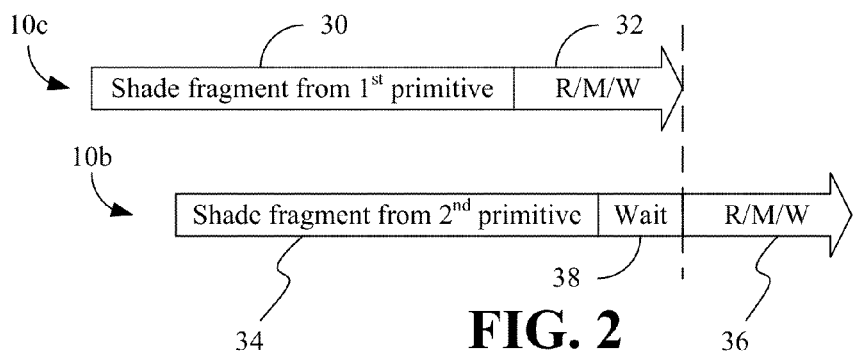
FIG. 2 is an illustration of an example of an ordering solution according to an embodiment.

FIG. 2 shows an ordering solution in which the third thread 10c includes a shade portion 30 that shades a fragment from a first primitive and a read/modify/write (R/M/W) portion 32 that accesses a R/W resource (e.g., DIRECTX unordered access view, OPENGL image) such as, for example, the R/W resource 12 (FIG. 1), at a common screen location. Additionally, the second thread 10b may include a shade portion 34 that shades a fragment from a second primitive and a R/M/W portion 36 that accesses the R/W resource at the common screen location. In the illustrated example, a wait period 38 is imposed until the R/M/W portion 32 of the third thread 10c is completed, so that the R/M/W portion 36 of the second thread 10b does not interfere with the R/M/W portion 32 of the third thread 10c.

Figure 3:
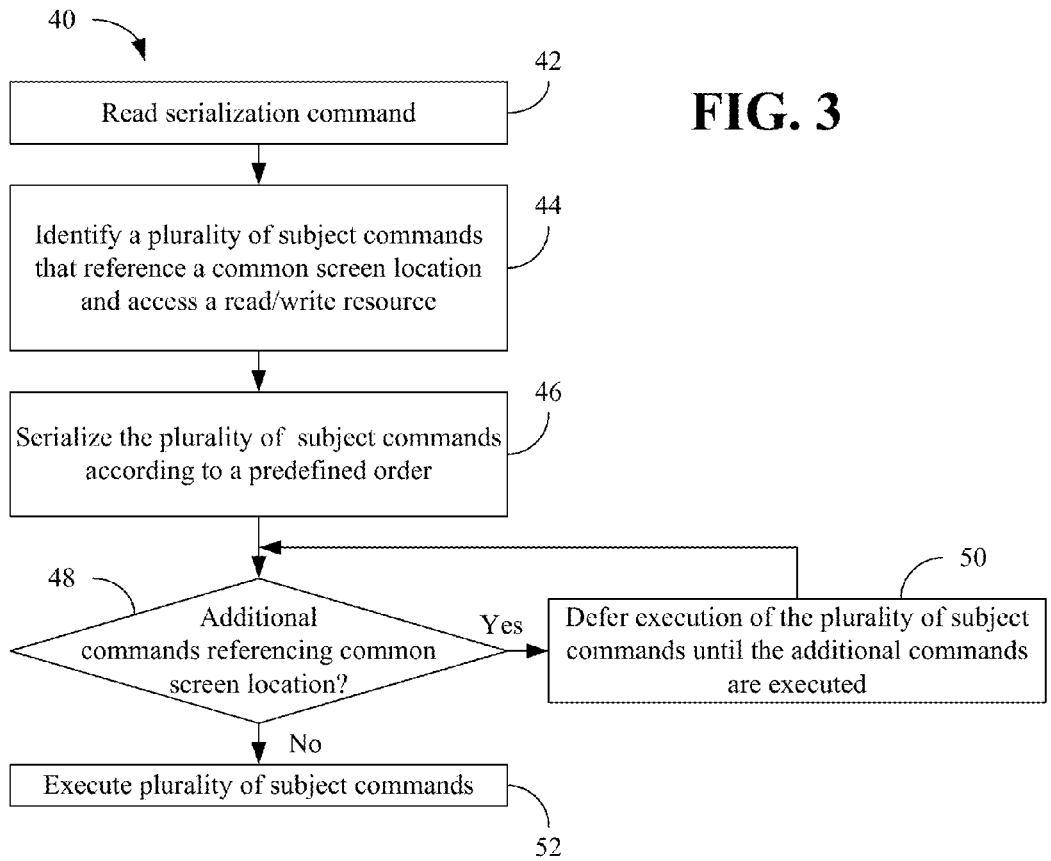
FIG. 3 is a flowchart of an example of a method of processing commands according to an embodiment.

Turning now to FIG. 3, a method 40 of processing commands is shown. The method 40 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 42 provides for reading a serialization command. The serialization command may be read in a language such as, for example, HLSL, GLSL, and so forth. Moreover, the serialization command may be encountered inside a conditional loop (e.g., IF branch) and/or outside a conditional loop, depending upon the circumstances. In the event that the serialized command is encountered more than once in a particular shader thread, only the first occurrence may have an impact on ordering for that thread. Block 44 may identify a plurality of subject commands that reference a common screen location and access a R/W resource (e.g., DIRECTX unordered access view, OPENGL image), wherein the plurality of subject commands may be serialized, in response to the serialization command, according to a predefined order at block 46. As already noted, the predefined order may be determined based on, for example, the rasterization order of incoming primitives associated with the plurality of subject commands.

A determination may be made at block 48 as to whether there are additional commands (e.g., from other pixel shader threads) referencing the common screen location. If so, execution of the plurality of subject commands is deferred at block 50 until the additional commands are executed. Once the additional commands have completed, illustrated block 52 executes the plurality of subject commands. Below is an example implementation of a serialization command "BeginPixelOrdering( )".

```
{
  BeginPixelOrdering( );
  uint rgbe = gRGBEBuffer[xy]; //read from resource
  float3 dstRGB = RGBE_to_RGG(rgbe); //modify
  dstRGB = alpha * rgb + (1 - alpha) * dstRGB; //modify
  gRGBEBuffer[xy] = RGB_to_RGBE(dstRGB); //write to resource
}
```

Figure 4:
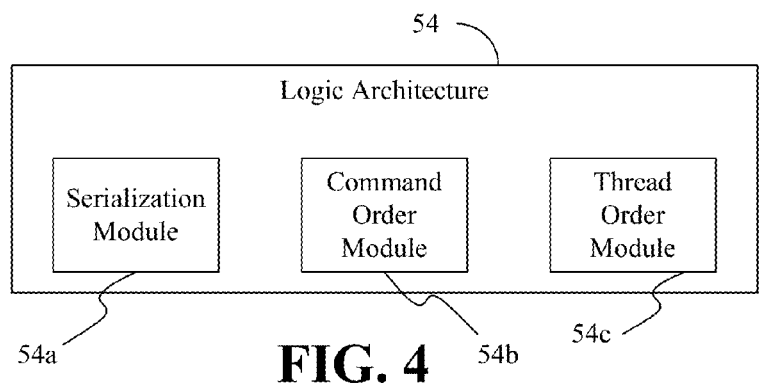
FIG. 4 is a block diagram of an example of a logic architecture according to an embodiment.

FIG. 4 shows a logic architecture 54 (54a-54c) to process commands associated with the presentation of visual content. The architecture 54 may generally implement one or more aspects of the method 40 (FIG. 3), already discussed. In the illustrated example, the architecture 54 includes a serialization module 54a to identify a plurality of subject commands that reference a common screen location and access a R/W resource (e.g., unordered access view, image). The plurality of subject commands may be identified and/or serialized in response to a serialization command, which might be read in a language such as, for example, HLSL, GLSL, and so forth. For example, a command order module 54b may serialize the plurality of subject commands according to a predefined order, wherein the command order module 54b may determine the predefined order based on, for example, a rasterization order of incoming primitives associated with the plurality of subject commands. In addition, the illustrated architecture 54 includes a thread order module 54c that defers execution of the plurality of subject commands until one or more additional commands referencing the common screen location are executed. In one example, the plurality of subject commands are associated with a first pixel shader thread and the one or more additional commands are associated with a second pixel shader thread.

Thread dependency registers may be used to store the dependencies of each thread relative to other threads. When each pixel shader reaches a serialization point, an instruction may be used to cause each pixel shader to wait until an earlier started pixel shader writes pixels to the R/W resource. A rasterizer can enforce a starting order of pixel shaders and a scoreboard may be used to enforce the order of completion of commands.

Figure 5:
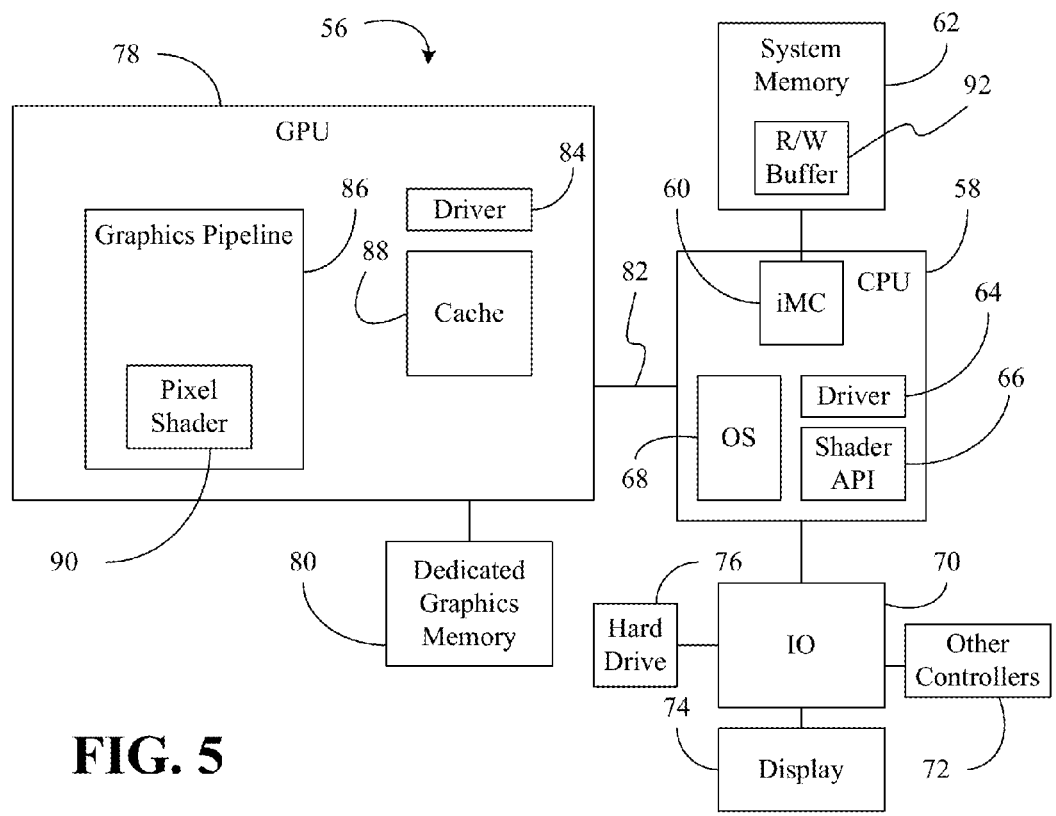
FIG. 5 is a block diagram of an example of a system according to an embodiment.

Turning now to FIG. 5, a computing system 56 is shown, wherein the system 56 may be part of a mobile platform such as a laptop, mobile Internet device (MID), personal digital assistant (PDA), media player, imaging device, wearable computer, etc., any smart device such as a smart phone, smart tablet, smart TV (television) and so forth, or any combination thereof. The system 56 may also be part of a fixed platform such as a personal computer (PC), server, workstation, etc. The illustrated system 56 includes a central processing unit (CPU, e.g., host processor) 58 with an integrated memory controller (iMC) 60 that provides access to system memory 62, which could include, for example, double data rate (DDR) synchronous dynamic random access memory (SDRAM, e.g., DDR3 SDRAM JEDEC Standard JESD79-3C, April 2008) modules. The modules of the system memory 62 may be incorporated, for example, into a single inline memory module (SIMM), dual inline memory module (DIMM), small outline DIMM (SODIMM), and so on.

The CPU 58 may also have one or more drivers 64, a pixel shader API (application programming interface) 66 and/or processor cores (not shown), where each core may be fully functional with instruction fetch units, instruction decoders, level one (L1) cache, execution units, and so on. In one example, the pixel shader API 66 is configured to contain one or more serialization commands that make function calls in a high level language such as, for example, HLSL, GLSL, etc. The CPU 58 could alternatively communicate with an off-chip variation of the iMC 60, also known as a Northbridge, via a front side bus or a point-to-point fabric that interconnects each of the components in the system 56. The CPU 58 may also execute an operating system (OS) 68.

The illustrated CPU 58 communicates with an input/output (IO) module 70, also known as a Southbridge, via a bus. The iMC 60/CPU 58 and the IO module 70 are sometimes referred to as a chipset. The CPU 58 may also be operatively connected to a network (not shown) via a network port through the IO module 70 and various other controllers 72. Thus, the other controllers 72 could provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 70 may also communicate with a display 74 to provide for the visual output/presentation of video, images, and other content. The other controllers 72 could also communicate with the IO module 70 to provide support for user interface devices (not shown) such as a keypad, mouse, etc., in order to allow a user to interact with and perceive information from the system 56.

The IO module 70 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IO module 70 is also coupled to storage, which may include a hard drive 76, read only memory (ROM), optical disk, flash memory (not shown), etc.

The illustrated system 56 also includes a dedicated graphics processing unit (GPU, graphics processor) 78 coupled to a dedicated graphics memory 80. The dedicated graphics memory 80 could include, for example, GDDR (graphics DDR) or DDR SDRAM modules, or any other memory technology suitable for supporting graphics rendering. The GPU 78 and graphics memory 80 might be installed on a graphics/video card, wherein the GPU 78 may communicate with the CPU 58 via a graphics bus 82 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto a system motherboard, into the main CPU 58 die, configured as a discrete card on the motherboard, etc. The GPU 78 may also execute one or more drivers 84, and may include a graphics pipeline 86 and an internal cache 88 to store instructions and other data.

Alternatively, the GPU 78 may lack a dedicated graphics memory and instead share the system memory 62 with the CPU 92. Such a configuration might be used for integrated graphics architectures in which the GPU 78 and the CPU 58 are part of the same die (e.g., and connected through an appropriate interface).

The illustrated graphics pipeline 86 includes a pixel shader 90 capable of running multiple pixel shader invocations in a highly parallelized graphics solution. In one example, the shader API 66 includes logic such as, for example, the logic architecture 54 (FIG. 4), already discussed. Therefore, the shader API 66 may be configured to identify a plurality of subject commands in the pixel shader 90 that reference a common screen location and access a R/W resource such as a R/W buffer 92 in the system memory 62. The shader API 66 may also serialize the plurality of subject commands according to a predefined order and defer execution of the plurality of subject commands until one or more additional commands referencing the common screen location are executed.

Figure 6:
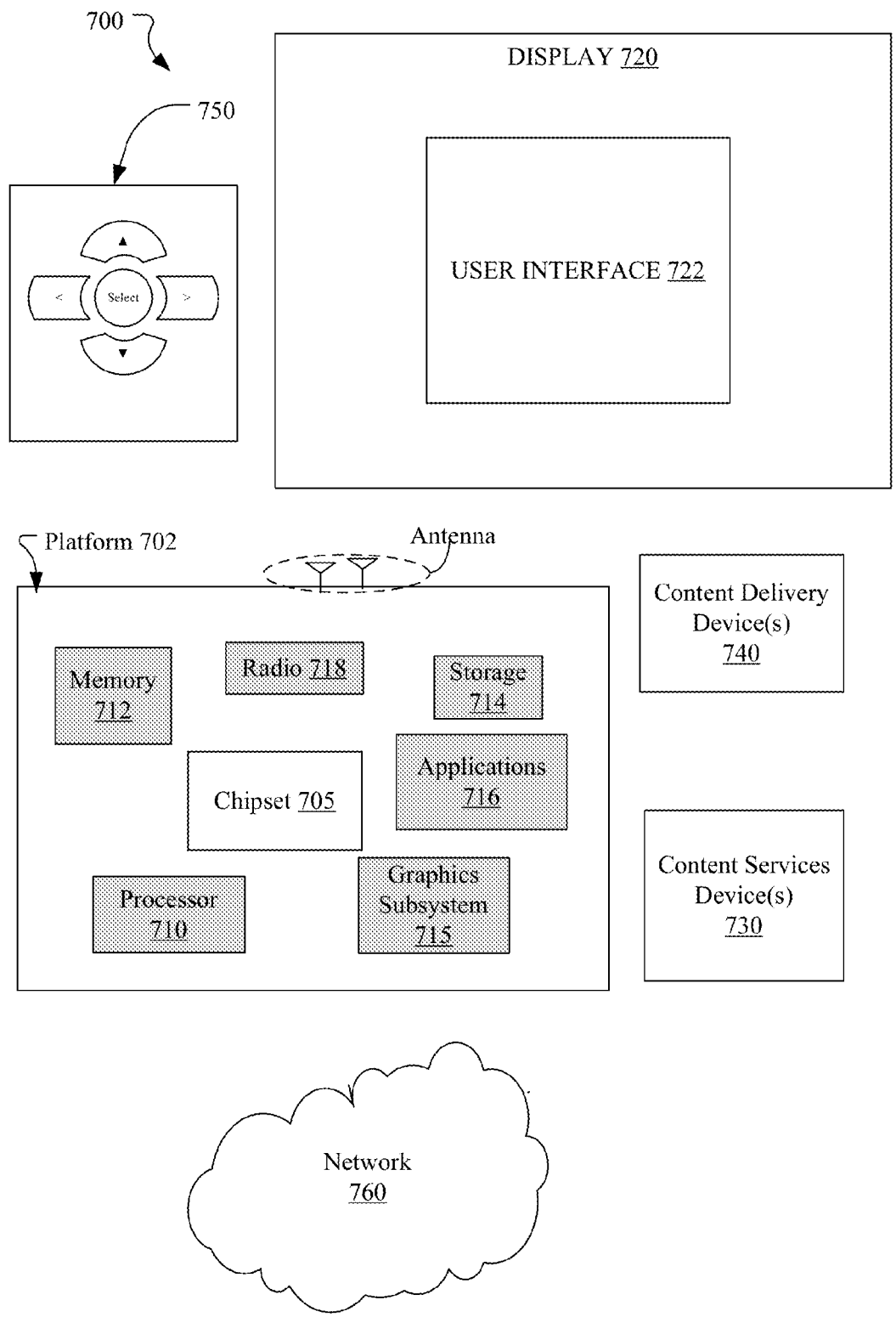
FIG. 6 is a block diagram of an example of a system having a navigation controller according to an embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to render images as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the GPU 78 (FIG. 5), already discussed. In addition, the processor 710 may be configured to operate as the CPU 58 (FIG. 5), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
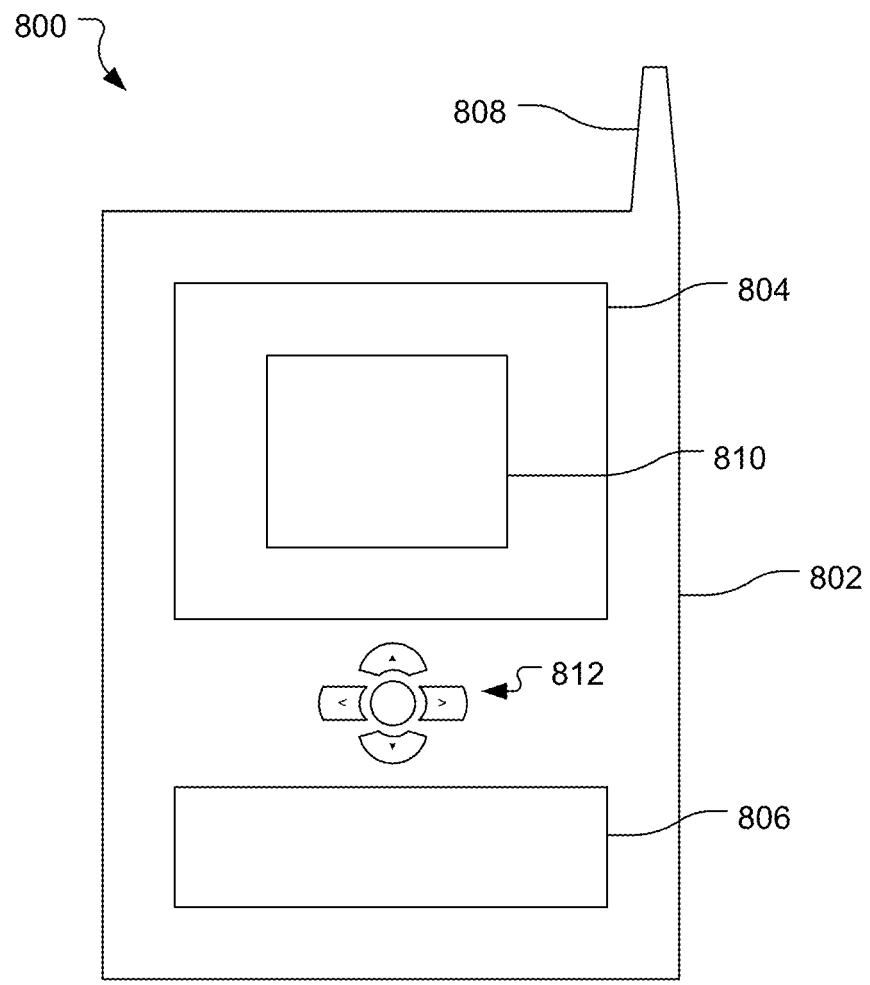
FIG. 7 is a block diagram of an example of a system having a small form factor according to an embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system to present visual content, comprising a display to output visual content based on pixel data, a serialization module to identify a plurality of subject commands that reference a common screen location and access a read/write resource, a command order module to serialize the plurality of subject commands according to a predefined order, and a thread order module to defer execution of the plurality of subject commands until one or more additional commands referencing the common screen location are executed, wherein execution of the plurality of subject commands and the one or more additional commands generates the pixel data.

Example 2 may include the system of Example 1, wherein the plurality of subject commands are to be serialized in response to a serialization command.

Example 3 may include the system of Example 2, wherein the serialization module is to read the serialization command in one of a High Level Shading Language or an OPENGL Shading Language.

Example 4 may include the system of any one of Examples 1 to 3, wherein the command order module is to determine the predefined order based on a rasterization order of incoming primitives associated with the plurality of subject commands.

Example 5 may include the system of any one of Examples 1 to 3, wherein the plurality of subject commands are to be associated with a first pixel shader thread and the one or more additional commands are to be associated with a second pixel shader thread.

Example 6 may include the system of any one of Examples 1 to 3, wherein the plurality of subject commands are to reference one of a DIRECTX unordered access view or an OPENGL image.

Example 7 may include a method of processing commands, comprising identifying a plurality of subject commands that reference a common screen location and access a read/write resource, serializing the plurality of subject commands according to a predefined order, and deferring execution of the plurality of subject command until one or more additional commands referencing the common screen location are executed.

Example 8 may include the method of Example 7, wherein the plurality of subject commands are serialized in response to a serialization command.

Example 9 may include the method of Example 8, further including reading the serialization command in one of a High Level Shading Language or an OPENGL Shading Language.

Example 10 may include the method of any one of Examples 7 to 9, further including determining the predefined order based on a rasterization order of incoming primitives associated with the plurality of subject commands.

Example 11 may include the method of any one of Examples 7 to 9, wherein the plurality of subject commands are associated with a first pixel shader thread and the one or more additional commands are associated with a second pixel shader thread.

Example 12 may include the method of any one of Examples 7 to 9, wherein the plurality of subject commands reference one of a DIRECTX unordered access view or an OPENGL image.

Example 13 may include at least one computer readable storage medium comprising a set of instructions which, if executed by a computing device, cause the computing device to identify a plurality of subject commands that reference a common screen location and access a read/write resource, serialize the plurality of subject commands according to a predefined order, and defer execution of the plurality of subject commands until one or more additional commands referencing the common screen location are executed.

Example 14 may include the at least one computer readable storage medium of Example 13, wherein the plurality of subject commands are to be serialized in response to a serialization command.

Example 15 may include the at least one computer readable storage medium of Example 14, wherein the instructions, if executed, cause a computing device to read the serialization command in one of a High Level Shading Language or an OPENGL Shading Language.

Example 16 may include the at least one computer readable storage medium of any one of Examples 13 to 16, wherein the instructions, if executed, cause a computing device to determine the predefined order based on a rasterization order of incoming primitives associated with the plurality of subject commands.

Example 17 may include the at least one computer readable storage medium of any one of Examples 13 to 16, wherein the plurality of subject commands are to be associated with a first pixel shader thread and the one or more additional commands are to be associated with a second pixel shader thread.

Example 18 may include the at least one computer readable storage medium of any one of Examples 13 to 16, wherein the plurality of subject commands are to reference one of a DIRECTX unordered access view or an OPENGL image.

Example 19 may include an apparatus to process commands, comprising a serialization module to identify a plurality of subject commands that reference a common screen location and access a read/write resource, a command order module to serialize the plurality of subject commands according to a predefined order, and a thread order module to defer execution of the plurality of subject commands until one or more additional commands referencing the common screen location are executed.

Example 20 may include the apparatus of Example 19, wherein the plurality of subject commands are to be serialized in response to a serialization command.

Example 21 may include the apparatus of Example 20, wherein the serialization module is to read the serialization command in one of a High Level Shading Language or an OPENGL Shading Language.

Example 22 may include the apparatus of any one of Examples 19 to 21, wherein the command order module is to determine the predefined order based on a rasterization order of incoming primitives associated with the plurality of subject commands.

Example 23 may include the apparatus of any one of Examples 19 to 21, wherein the plurality of subject commands are to be associated with a first pixel shader thread and the one or more additional commands are to be associated with a second pixel shader thread.

Example 24 may include the apparatus of any one of Examples 19 to 21, wherein the plurality of subject commands are to reference one of a DIRECTX unordered access view or an OPENGL image.

Example 25 may include an apparatus to process commands, comprising means for performing the method of any of Examples 7 to 12.

Techniques described herein may therefore reduce memory space requirements and memory bandwidth usage in OIT, blending and other applications by eliminating global memory atomic operations. For example, calling a serialization command may guarantee that any memory transactions issued by shader invocations from previous primitives and mapping to the same screen location are complete and visible to the shader invocation that called the serialization command.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system to present visual content, comprising:
a display to output visual content based on pixel data;
a serialization module, implemented at least partly in one or more of configurable logic or fixed functionality logic hardware, to identify a plurality of subject commands that reference a common screen location and access a read/write resource in response to a serialization command;
a command order module, implemented at least partly in one or more of configurable logic or fixed functionality logic hardware, to serialize the plurality of subject commands according to a predefined order, wherein the command order module is to determine the predefined order based on a rasterization order of incoming primitives associated with the plurality of subject commands identified by the serialization module; and
a thread order module, implemented at least partly in one or more of configurable logic or fixed functionality logic hardware, to defer execution of the plurality of subject commands until one or more additional commands referencing the common screen location are executed, wherein execution of the plurality of subject commands and the one or more additional commands generates the pixel data, the plurality of subject commands are associated with a first pixel shader thread, and the one or more additional commands are associated with a second pixel shader thread, and
wherein the plurality of subject commands are to be included in one or more threads, and a single serialization command is to serialize the plurality of subject commands.

2. The system of claim 1, wherein the serialization module is to read the serialization command in one of a High Level Shading Language or an OPENGL Shading Language.

3. The system of claim 1, wherein the plurality of subject commands are to reference one of a DIRECTX ordered access view or an OPENGL image.

4. A method of processing commands, comprising:
identifying, via a serialization module implemented at least partly in one or more of configurable logic or fixed functionality logic hardware, a plurality of subject commands that reference a common screen location and access a read/write resource in response to a serialization command;
serializing, via a command order module implemented at least partly in one or more of configurable logic or fixed functionality logic hardware, the plurality of subject commands according to a predefined order, wherein the predefined order is determined based on a rasterization order of incoming primitives associated with the plurality of subject commands identified by the serialization module; and
deferring, via a thread order module implemented at least partly in one or more of configurable logic or fixed functionality logic hardware, execution of the plurality of subject commands until one or more additional commands referencing the common screen location are executed, wherein execution of the plurality of subject commands and the one or more additional commands generates the pixel data, the plurality of subject commands are associated with a first pixel shader thread, and the one or more additional commands are associated with a second pixel shader thread, and
wherein the plurality of subject commands are included in one or more threads, and a single serialization command serializes the plurality of subject commands.

5. The method of claim 4, further including reading the serialization command in one of a High Level Shading Language or an OPENGL Shading Language.

6. The method of claim 4, wherein the plurality of subject commands reference one of a DIRECTX ordered access view or an OPENGL image.

7. At least one non-transitory computer readable storage medium comprising a set of instructions which, if executed by a computing device, cause the computing device to:
identify a plurality of subject commands that reference a common screen location and access a read/write resource in response to a serialization command;
serialize the plurality of subject commands according to a predefined order, wherein the predefined order is to be determined based on a rasterization order of incoming primitives associated with the plurality of subject commands identified in response to the serialization command; and
defer execution of the plurality of subject commands until one or more additional commands referencing the common screen location are executed, wherein execution of the plurality of subject commands and the one or more additional commands generates the pixel data, the plurality of subject commands are associated with a first pixel shader thread, and the one or more additional commands are associated with a second pixel shader thread, and
wherein the plurality of subject commands are to be included in one or more threads, and a single serialization command is to serialize the plurality of subject commands.

8. The at least one non-transitory readable storage medium of claim 7, wherein the instructions, if executed, cause a computing device to read the serialization command in one of a High Level Shading Language or an OPENGL Shading Language.

9. The at least one non-transitory computer readable storage medium of claim 7, wherein the plurality of subject commands are to reference one of a DIRECTX ordered access view or an OPENGL image.

10. An apparatus to process commands, comprising:
a serialization module, implemented at least partly in one or more of configurable logic or fixed functionality logic hardware, to identify a plurality of subject commands that reference a common screen location and access a read/write resource in response to a serialization command;
a command order module, implemented at least partly in one or more of configurable logic or fixed functionality logic hardware, to serialize the plurality of subject commands according to a predefined order, wherein the command order module is to determine the predefined order based on a rasterization order of incoming primitives associated with the plurality of subject commands identified by the serialization module; and
a thread order module, implemented at least partly in one or more of configurable logic or fixed functionality logic hardware, to defer execution of the plurality of subject commands until one or more additional commands referencing the common screen location are executed, wherein execution of the plurality of subject commands and the one or more additional commands generates the pixel data, the plurality of subject commands are associated with a first pixel shader thread, and the one or more additional commands are associated with a second pixel shader thread, and
wherein the plurality of subject commands are to be included in one or more threads, and a single serialization command is to serialize the plurality of subject commands.

11. The apparatus of claim 10, wherein the serialization module is to read the serialization command in one of a High Level Shading Language or an OPENGL Shading Language.

12. The apparatus of claim 10, wherein the plurality of subject commands are to reference one of a DIRECTX ordered access view or an OPENGL image.

* * * * *